United States Patent [19]
Mori

[11] Patent Number: 5,303,086
[45] Date of Patent: Apr. 12, 1994

[54] ZOOM LENS WITH CLOSE-UP LENS

[75] Inventor: Masao Mori, Ohmiya, Japan

[73] Assignee: Fuji Photo Optical Co., Ltd., Saitama, Japan

[21] Appl. No.: 13,753

[22] Filed: Feb. 4, 1993

[30] Foreign Application Priority Data

Mar. 24, 1992 [JP] Japan .................... 4-015299[U]

[51] Int. Cl.⁵ .................................................. G02B 15/14
[52] U.S. Cl. .................................... 359/683; 359/693
[58] Field of Search ................................ 359/683, 693

[56] References Cited

U.S. PATENT DOCUMENTS

| | | | |
|---|---|---|---|
| 3,482,900 | 12/1969 | Wagner | 359/683 |
| 3,961,845 | 6/1976 | Doi et al. | 359/683 |
| 3,970,367 | 7/1976 | Tsuji | 359/683 |
| 4,854,685 | 9/1989 | Corbasson | 359/683 |
| 4,906,078 | 3/1990 | Inabata et al. | 359/683 |
| 4,988,174 | 1/1991 | Horiuchi et al. | 359/683 |
| 5,042,927 | 8/1991 | Ogawa et al. | 359/683 |
| 5,100,223 | 3/1992 | Ono et al. | 359/683 |
| 5,196,962 | 3/1993 | Aoki | 359/689 |
| 5,218,476 | 6/1993 | Ito | 359/689 |
| 5,241,421 | 8/1993 | Endo et al. | 359/683 |

*Primary Examiner*—John T. Kwon
*Attorney, Agent, or Firm*—Brumbaugh, Graves, Donohue & Raymond

[57] ABSTRACT

A zoom lens with a close-up lens has first to fifth lens groups arranged in this order from the object side. Each of the first, second and fifth lens groups has a positive power and each of the third and fourth lens groups has a negative power. The first to fifth lens groups are arranged so that the spaces between the second to fifth lens groups change when the zoom lens is zoomed from a shortest focal length to a longest focal length and at the same time the first lens group can be moved along the optical axis in response to change in the optical length between an object point and the first lens group so that the object side focal point of the first lens group coincides with the object point.

2 Claims, 11 Drawing Sheets

FIG. 6A −1/14.30× (WITHOUT PRISM)
FIG. 6B −1/6.45×
FIG. 6C −1/2.50×

FIG.7A  
M=-1/14.30  
EFFECTIVE F No.=1.8  
SPHERICAL ABERRATION

FIG.7B  
ANGLE OF VIEW ω=10.9°  
ASTIGMATISM

FIG.7C  
ANGLE OF VIEW ω=10.9°  
DISTORTION

ZOOM LENS WITH CLOSE-UP LENS

BACKGROUND OF THE INVENTION

1. Field of the Invention

This invention relates to a zoom lens with a close-up lens which is used in an enlarger or the like, and more particularly to a conjugate distance variable zoom lens with a close-up lens disposed on the light measuring system side of a prism which splits light bundle transmitted through a negative film into light bundles traveling toward a printing system and a light measuring system.

2. Description of the Prior Art

As a color printer for printing a color negative image on a color photographic paper, there has been known one in which light bundle transmitted through a negative film bearing thereon the negative image is led to a light measuring system by a mirror or the like and the pattern, density, color and the like of the color negative image are inspected by a scanner and the intensity of light and color balance of light to be given to a color photographic paper are automatically controlled on the basis of the result of the inspection.

There are various negative films such as Disc film, 135 film, 120 rollfilm and the like which are different in size. Accordingly, when printing an image on a color photographic paper, the printing lens must be changed according to the size of the negative film and at the same time, the scanner lens must be changed or the magnification of the scanner lens must be changed.

Generally the magnification of the scanner lens is manually changed, which can lead to wrong setting of the magnification. In order to avoid such a problem, there has been proposed a system in which the magnification of the scanner lens is automatically changed in response to change of the printing lens.

Since, in such a printer, the print lens is disposed just above the negative film, the scanner lens must inspect the negative film obliquely or by way of a mirror. However, to obliquely mount the scanner lens is more difficult than to mount it vertically or horizontally, and when the mirror is moved in and out each time the negative film is inspected, the number of prints per unit time is reduced.

There has been proposed an optical system in which a split prism is connected to print lenses which are for a small negative film and are frequently used and the light measurement is effected through the prism while in the case of print lenses which are for a large negative film and are used less frequently, the light measurement is effected through a mirror taking into account the cost of a prism.

However such an optical system gives rise to a problem that the conjugate length for a given magnification of the scanner lens changes depending on the presence of absence of the prism. In conventional scanner lenses, focusing of the scanner lens in response to change in the conjugate length results in change of the magnification and deterioration of the lens performance.

SUMMARY OF THE INVENTION

In view of the foregoing observations and description, the primary object of the present invention is to provide a zoom lens with a close-up lens whose magnification and performance do not change upon focusing in response to change in the conjugate length.

Another object of the present invention is to provide a zoom lens with a close-up lens whose magnification and performance do not change upon focusing in response to change in the conjugate length and at the same time which is free from eclipse and which permits systems using the lens system to be compactly arranged.

The zoom lens with a close-up lens in accordance with the present invention has first to fifth lens groups arranged in this order from the object side, each of the first, second and fifth lens groups having a positive power and each of the third and fourth lens groups having a negative power. The first to fifth lens groups are arranged so that the spaces between the second to fifth lens groups change when the zoom lens is zoomed from a shortest focal length to a longest focal length and at the same time the first lens group can be moved along the optical axis in response to change in the optical length between an object point and the first lens group so that the object side focal point of the first lens group coincides with the object point.

The change in the optical length between the object point and the first lens group means change in the optical length caused, for instance, by the presence or absence of the prism (due to the difference in the refractive index between the prism and the air).

In one preferred embodiment of the present invention, the focal length f1 of the first lens group, the focal length f2 of the second lens group, the optical length d in a prism inserted into the optical path between the object point and the first lens group and the refractive index N of the prism satisfy both the following formulae.

$$2.0 < f1/f2 < 4.5 \tag{1}$$

$$10.0 < (1-1/N)d < 32.5 \tag{2}$$

In the zoom lens with a close-up lens in accordance with the present invention, since the first lens group is moved so that the front focal point of the first lens group constantly coincides with the object point, afocal light constantly enters the second lens group irrespective of change in the conjugate length due to the presence or absence of the prism and accordingly change in the magnification or deterioration of the lens performance cannot be caused.

The condition defined by the formula (1) is for suppressing generation of aberration and shortening the conjugate length. That is, when f1/f2 is not larger than 2.0, aberration becomes large and the lens performance greatly deteriorates. On the other hand when f1/f2 is not smaller than 4.5, the conjugate length becomes too large to compactly arrange the overall system.

The condition defined by the formula (2) is for preventing eclipse and compactly arranging the system using the lens of the present invention. That is, when $(1-1/N)d$ becomes not larger than 10.0, eclipse of the image on the negative film can occur and when $(1-1/N)d$ becomes not smaller than 32.5, the prism must be larger and the distance between the print lens and the negative film becomes too large. When the distance between the print lens and the negative film is large, it becomes necessary to design a lens system having a long back focus without changing the magnification, which is very difficult.

DESCRIPTION OF THE PREFERRED EMBODIMENT

Figure 2:
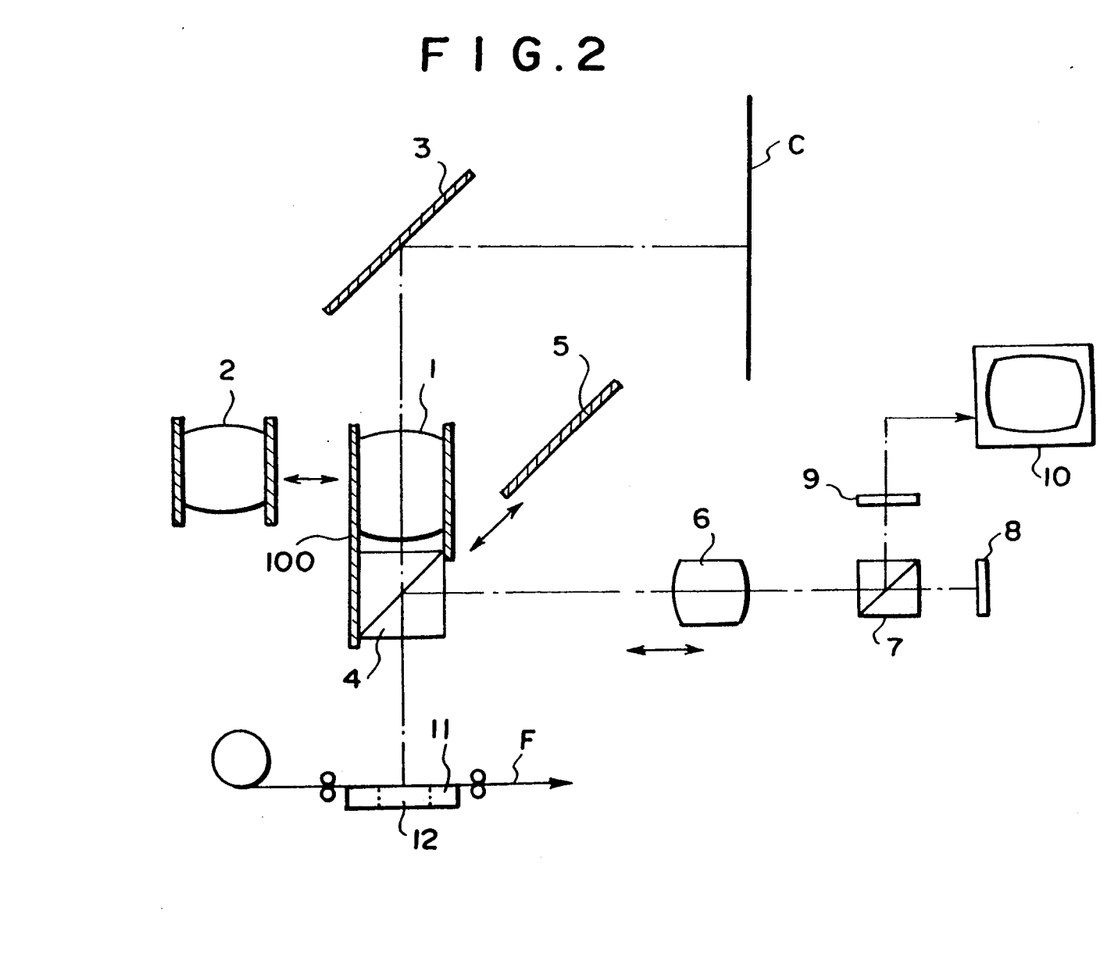
FIG. 2 is a schematic view showing an enlarger employing the zoom lens.

In FIG. 2, an enlarger has a replaceable negative mask 11 having a rectangular opening 12. A negative film F is fed passing across the opening 12. An image on the negative film F is projected on a photographic paper C through a print lens and a mirror 3. As the print lens, one of a zoom lens 1 and a variable focal length lens 2 is selectively used according to the size of the negative film F. The zoom lens 1 is integrally connected with a split prism 4 to form a zoom lens system 100. When the zoom lens system 100 is used a part of the light bundle transmitted through the negative film F is led to a light measuring system (to be described later) by the split prism 4. When the variable focal length lens 2 is used in place of the zoom lens 1, the zoom lens system 100 is removed and the variable focal length lens 2 is inserted into the optical path of the light bundle transmitted through the negative film F and a mirror 5 is inserted into the optical path upstream of the variable focal length lens 2. In this case, a part of the light bundle transmitted through the negative film F is led to the light measuring system by the mirror 5. The part of the light bundle deflected toward the light measuring system by the split prism 4 or the mirror 5 is focused on a photodetector 8 through a zoom lens 6 with a close-up lens in accordance with an embodiment of the invention (will be referred to simply as "the light measuring zoom lens 6", hereinbelow). A part of the light transmitted through the light measuring zoom lens 6 is deflected by another split prism 7 and focused on a light receiving surface of an image pickup element 9 for a monitor 10. The image signal output from the image pickup element 9 is input into the monitor 10 and is reproduced on the monitor 10 for positioning of the negative film F and the like. The negative mask 11 is changed according to the negative film F.

Since the refractive index of the prism 4 is larger than that of the air (=1), the front focal point is nearer to the light measuring zoom lens 6 when the split prism 4 is used than when the mirror 5 is used. Accordingly when the print lens is changed, the focal point of the light measuring zoom lens 6 must be adjusted.

Figure 1:
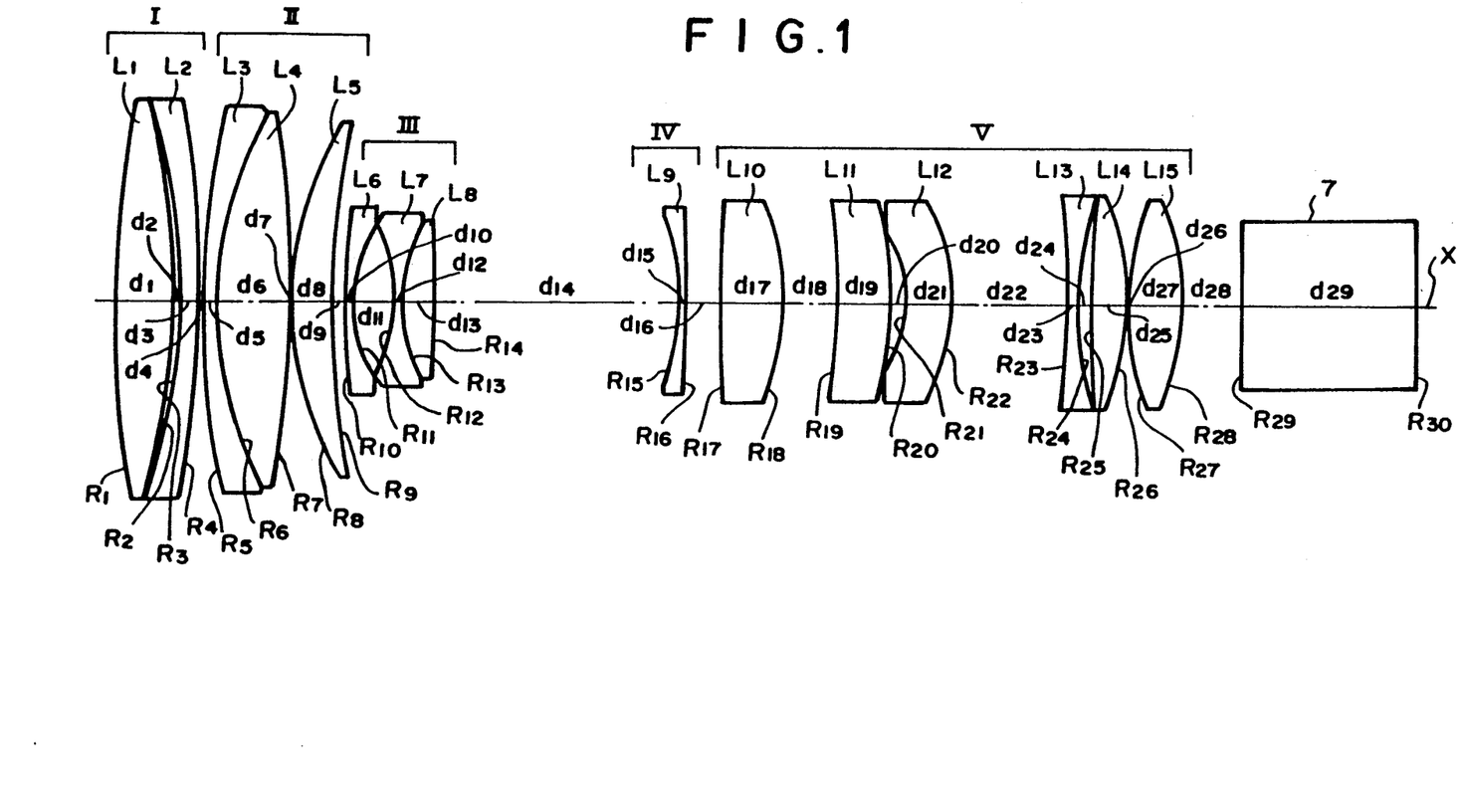
FIG. 1 is a cross-sectional showing a zoom lens with a close-up lens in accordance with an embodiment of the present invention.

As shown in FIG. 1, the light measuring zoom lens 6 comprises first to fifth lens groups I to V arranged in this order from the negative film side. The first lens group I has a positive refracting power and comprises a pair of lenses L1 and L2. The lens L1 is a double-convex lens and is positioned with its larger curvature (smaller radius of curvature) surface facing toward the prism 7. The lens L2 is a negative meniscus lens and is positioned with its convex surface facing toward the prism 7. The second lens group II has a positive refracting power and comprises three lenses L3 to L5. The lens L3 is a negative meniscus lens and is positioned with its convex surface facing toward the negative film F. The lens L4 is a double-convex lens and is positioned with its larger curvature surface facing toward the negative film F. The lens L5 is a positive meniscus lens and is positioned with its convex surface facing toward the negative film F. The third lens group III has a negative refracting power and comprises three lenses L6 to L8. The lens L6 is a negative meniscus lens and is positioned with its convex surface facing toward the negative film F. The lens L7 is a double-concave lens and is positioned with its larger curvature surface facing toward the prism 7. The lens L8 is a double-convex lens and is positioned with its larger curvature surface facing toward the negative film F. The fourth lens group IV has a negative refracting power and comprises a single lens L9 which is a negative meniscus lens and is positioned with its convex surface facing toward the prism 7. The fifth lens group V has a positive refracting power and comprises six lenses L10 to L15. The lens L10 is a double-convex lens and is positioned with its larger curvature surface facing toward the prism 7. The lens L11 is a positive meniscus lens and is positioned with its convex surface facing toward the prism 7. The lens L12 is a negative meniscus lens and is positioned with its convex surface facing toward the prism 7. The lens L13 is a double-concave lens and is positioned with its larger curvature surface facing toward the prism 7. The lens L14 is a double-convex lens and is positioned with its larger curvature surface facing toward the prism 7. The lens L15 is a double-convex lens whose opposite surfaces are equal to each other in curvature.

The distances between the lens groups I to V are variable and the fifth lens group V is fixed relative to the prism 7.

The light measuring zoom lens 6 satisfies the following formula.

$$2.0 < f1/f2 < 4.5 \quad (1)$$

$$10.0 < (1 - 1/N)d < 32.5 \quad (2)$$

wherein f1 represents the synthetic focal length of the first lens group I, f2 represents the synthetic focal length of the second lens group II, d represents the optical length in the prism 4 and N represents the refractive index of the prism 4.

When the formula (1) is satisfied, generation of aberration is suppressed and the conjugate length is shortened. When the formula (2) is satisfied eclipse is prevented and the system using the zoom lens 6 can be compactly arranged.

The magnification M of the zoom lens 6 of this embodiment is variable within the range of −1/14.3 to −1/2.5 and the focal length f(mm), the back focus Bf(mm), F-number $F_{NO}$ and the image height (negative size) Y(mm) of the zoom lens 6 at the respective magnifications are as shown in table 1. The effective F-number is 2.0 at any magnification.

TABLE 1

| magnification M | −1/14.30 | −1/6.45 | −1/2.50 |
| --- | --- | --- | --- |
| focal length f | 18.21 | 71.64 | −152.00 |
| back focus Bf | 40.58 | 30.75 | 102.66 |
| F-number $F_{NO}$ | 2.00 | 2.04 | — |
| image height Y | 6.72 | 21.40 | 48.83 |

The radii of curvature R(mm) of the respective lens surfaces, the axial surface separations d (mm) (the central thicknesses of the lenses and the air spaces between adjacent lenses), the refractive indexes N at D line of the lenses and the Abbe's number νd are as shown in table 2. In table 2, the numbers in the leftmost column represents the numbers given to the symbols R and d in FIG. 1.

TABLE 2

| NO | R | d | N | νd |
| --- | --- | --- | --- | --- |
| 1 | 130.52 | 6.95 | 1.59143 | 61.2 |
| 2 | −93.963 | 0.79 | | |
| 3 | −75.188 | 2.45 | 1.81264 | 25.4 |
| 4 | −137.43 | 0.50(15.86) | | |
| 5 | 103.56 | 1.78 | 1.79191 | 25.7 |
| 6 | 48.170 | 9.00 | 1.59143 | 61.2 |
| 7 | −130.90 | 0.30 | | |
| 8 | 41.580 | 4.95 | 1.57088 | 63.1 |
| 9 | 102.56 | (variable $D_A$) | | |
| 10 | 102.56 | 0.82 | 1.72341 | 50.3 |
| 11 | 17.996 | 4.95 | | |
| 12 | −22.222 | 0.82 | 1.72341 | 50.3 |
| 13 | 19.881 | 3.87 | 1.81262 | 25.5 |
| 14 | −243.36 | (variable $D_B$) | | |
| 15 | −33.898 | 0.82 | 1.72794 | 38.0 |
| 16 | −342.06 | (variable $D_C$) | | |
| 17 | 253.16 | 7.55 | 1.76167 | 27.5 |
| 18 | −30.918 | 6.70 | | |
| 19 | −106.38 | 6.75 | 1.59143 | 61.2 |
| 20 | −44.002 | 1.44 | | |
| 21 | −17.361 | 5.52 | 1.81264 | 25.4 |
| 22 | −27.175 | 13.80 | | |
| 23 | −175.00 | 1.30 | 1.81264 | 25.4 |
| 24 | 38.610 | 1.62 | | |
| 25 | 170.63 | 4.35 | 1.62286 | 60.3 |
| 26 | −33.784 | 0.20 | | |
| 27 | 34.247 | 6.59 | 1.48915 | 70.2 |
| 28 | −34.247 | 7.00 | | |
| 29 | 0.0 | 21.00 | 1.51825 | 64.1 |
| 30 | 0.0 | | | |

R...radius of curvature
d...axial surface separation
N...refractive index
νd...Abbes number The focal lengths f1 to f5 of the first to fifth lens groups I to V are 168.30 mm, 61.72 mm, −16.40 mm, −51.75 mm and 39.09 mm, respectively.

The distances between the lens groups are variable. The distances $D_A$(mm), $D_B$(mm) and $D_C$(mm) between the second and third lens groups II and III, between the third and fourth lens groups III and IV and between the fourth and fifth lens groups IV and V at the respective magnifications (M) are shown in table 3. The distance between the first and second lens groups I and II are set to 0.50 mm when the prism 4 is in the optical path and to 15.86 mm when the prism 4 is not in the optical path. That is, when the prism 4 is not in the optical path, the first lens group I is positioned nearer to the negative film F by 15.36 mm than when the prism 4 is in the optical path, whereby the change in the optical length due to difference in the refractive index between the prim 4 and the air is compensated for. Thus the zoom lens 6 of this embodiment has function to prevent change in magnification and deterioration of the performance in addition to the normal zooming function.

TABLE 3

| magnification M | $D_A$ | $D_B$ | $D_C$ |
| --- | --- | --- | --- |
| −1/14.30 | 1.75 | 29.99 | 4.39 |
| −1/6.45 | 18.99 | 9.44 | 7.71 |
| −1/2.50 | 31.62 | 2.91 | 1.60 |

Figures 3A, 3B:
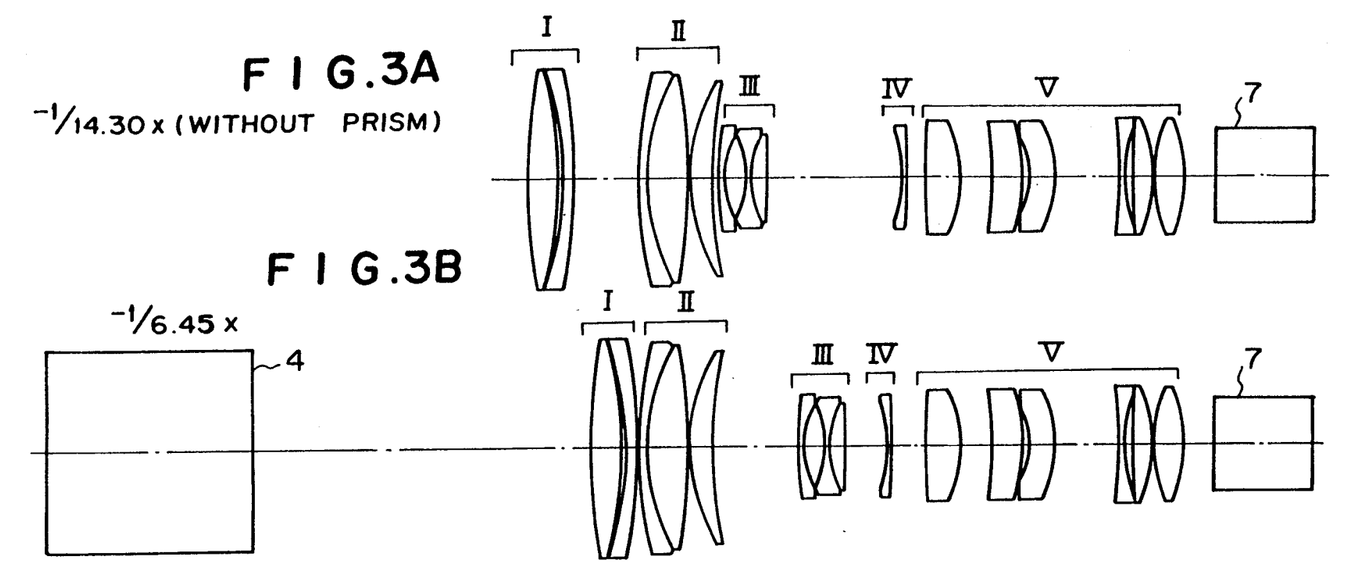
FIGS. 3A to 3C are cross-sectional views of the zoom lens at magnifications of −1/14.30, −1/6.45 and −1/2.50, respectively.
Figure 3C:
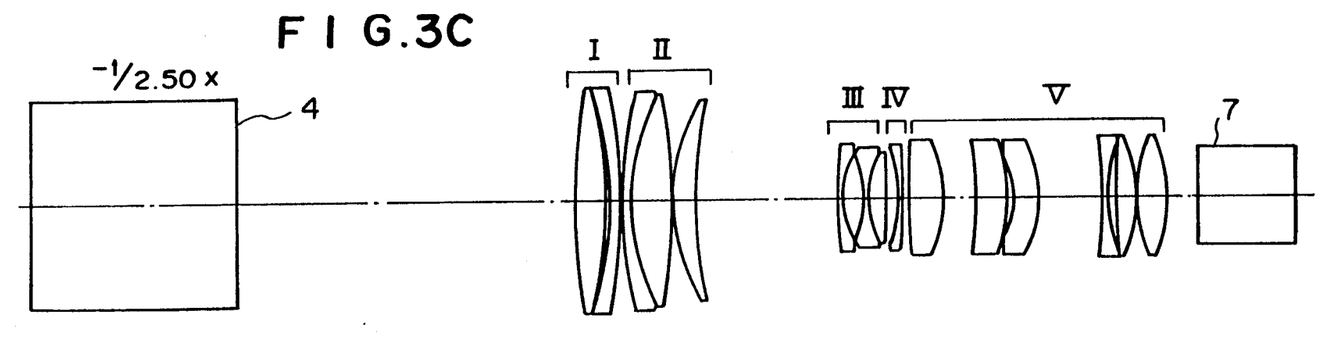
Figure 4A:
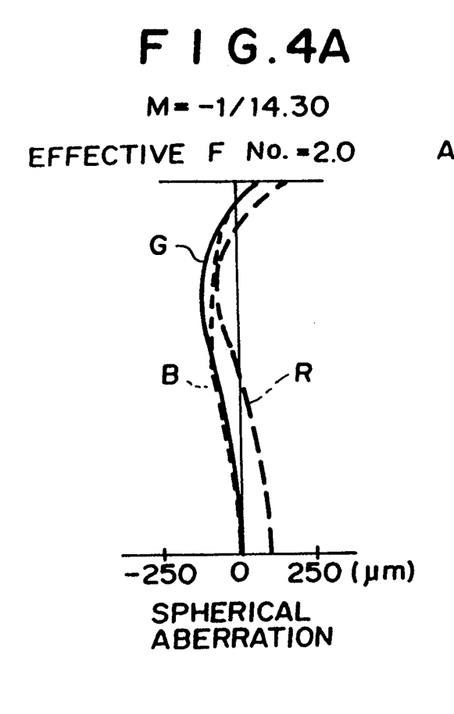
FIGS. 4A to 4C show the aberrations of the zoom lens at a magnification of −1/14.30.
Figure 4B:
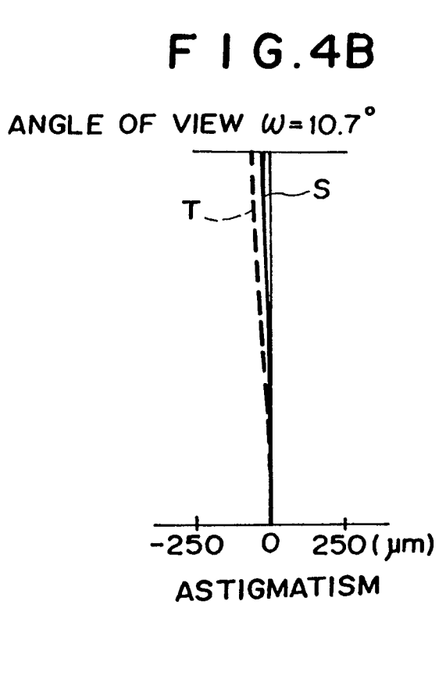
Figure 4C:
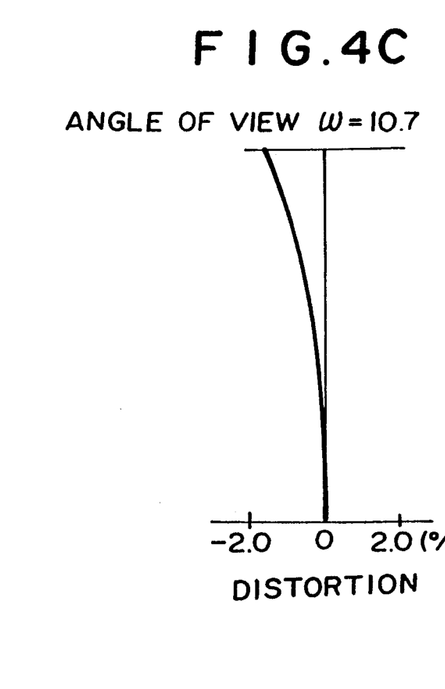
Figure 4D:
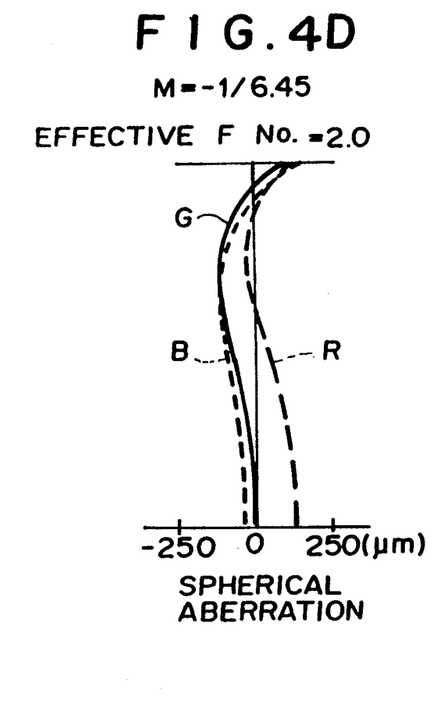
FIGS. 4D to 4F show the aberrations of the zoom lens at a magnification of −1/6.45.
Figure 4E:
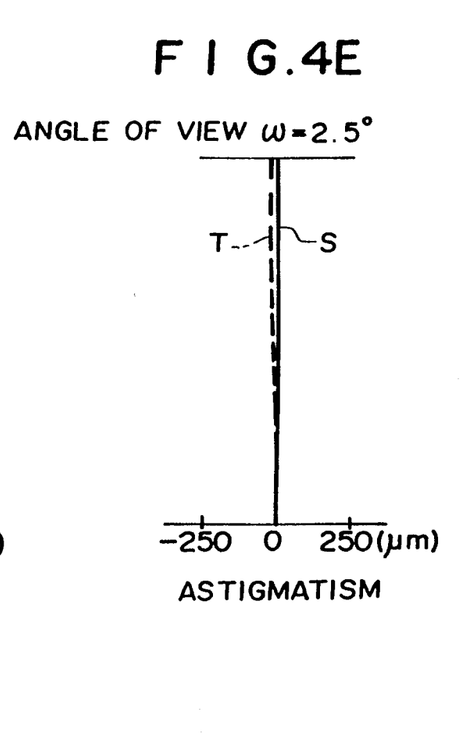
Figure 4F:
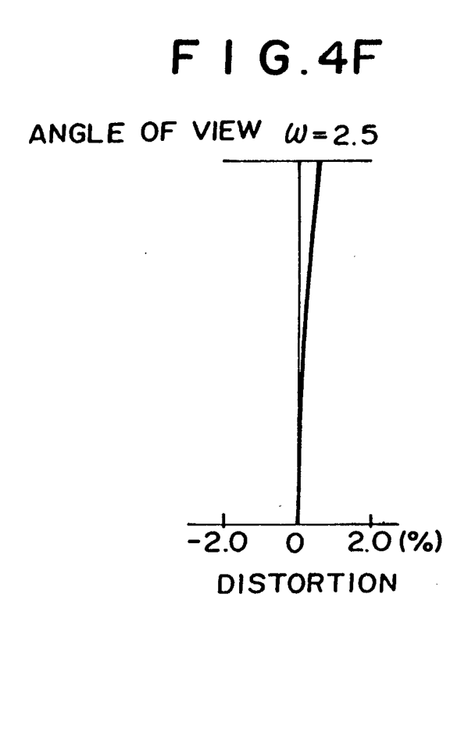
Figure 4G:
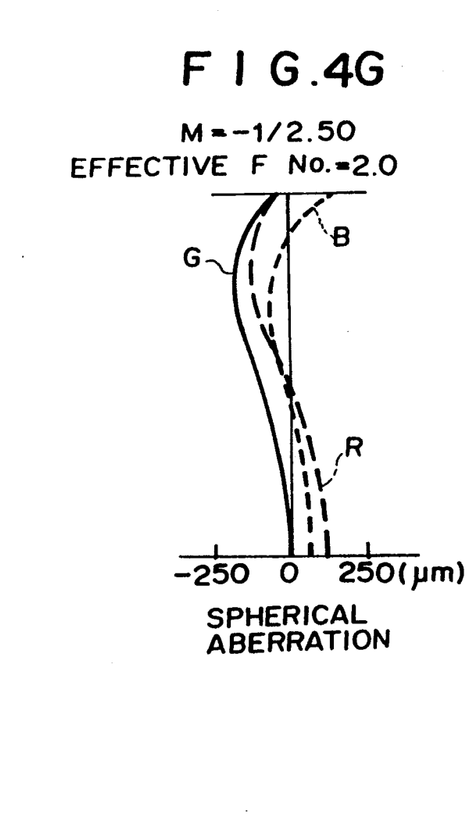
FIGS. 4G to 4I show the aberrations of the zoom lens at a magnification of −1/2.50.
Figure 4H:
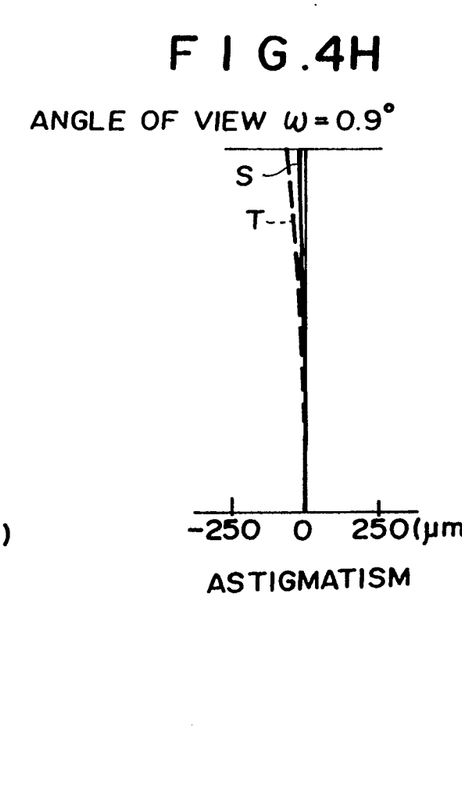
Figure 4I:
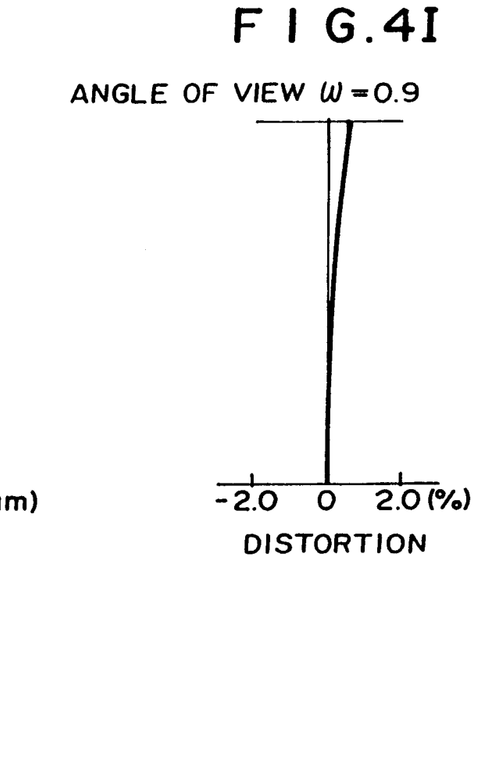

FIGS. 3A to 3C show the relative position of the first to fifth lens groups I to V at magnifications of −1/14.30 (without the prism 4), −1/6.45 and −1/2.50, respectively.

In this embodiment, since the distance between the first and second lens groups I and II can be switched between the two values described above, the magnification can be continuously changed even if the conjugate length changes in the course of zooming and at the same time, fluctuation in the respective aberrations can be suppressed.

FIG. 4 shows the aberrations at magnifications of −1/14.30, −1/6.45 and −1/2.50 in the zoom lens 6 of this embodiment.

As can be understood from FIG. 4, the zoom lens with a close-up lens of this embodiment exhibits excellent optical performance over its entire variable power range.

Figure 5:
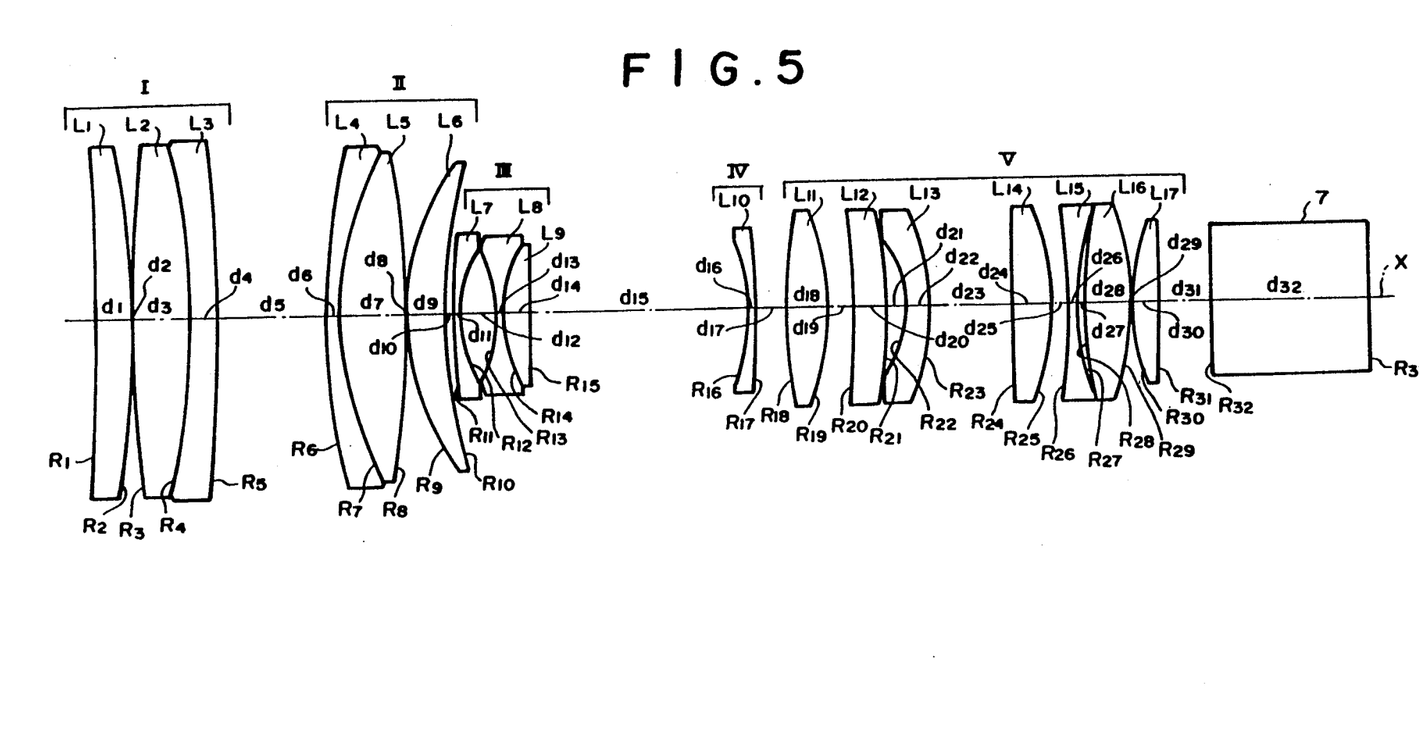
FIG. 5 is a cross-sectional showing a zoom lens with a close-up lens in accordance with a second embodiment of the present invention.

A zoom lens with a close-up lens 6 in accordance with a second embodiment of the present invention will be described with reference to FIG. 5, hereinbelow.

The light measuring zoom lens 6 of the second embodiment of the present invention comprises first to fifth lens groups I to V arranged in this order from the negative film side. The first lens group I has a positive refracting power and comprises three lenses L1 to L3. The lens L1 is a positive meniscus lens and is positioned with its convex surface facing toward the prism 7. The lens L2 is a double-convex lens and is positioned with its larger curvature surface facing toward the prism 7. The lens L3 is a negative meniscus lens and is positioned with its convex surface facing toward the prism 7. The second lens group II has a positive refracting power and comprises three lenses L4 to L6. The lens L4 is a negative meniscus lens and is positioned with its convex surface facing toward the negative film F. The lens L5 is a double-convex lens and is positioned with its larger curvature surface facing toward the negative film F. The lens L6 is a positive meniscus lens and is positioned with its convex surface facing toward the negative film F. The third lens group III has a negative refracting power and comprises three lenses L7 to L9. The lens L7 is a negative meniscus lens and is positioned with its convex surface facing toward the negative film F. The lens L8 is a double-concave lens and is positioned with its larger curvature surface facing toward the prism 7. The lens L9 is a double-convex lens and is positioned with its larger curvature surface facing toward the negative film F. The fourth lens group IV has a negative refracting power and comprises a single lens L10 which is a negative meniscus lens and is positioned with its convex surface facing toward the prism 7. The fifth lens group V has a positive refracting power and comprises seven lenses L11 to L17. The lens L11 is a double-convex lens and is positioned with its larger curvature surface facing toward the prism 7. The lens L12 is a positive meniscus lens and is positioned with its convex surface facing toward the prism 7. The lens L13 is a negative meniscus lens and is positioned with its convex surface facing toward the prism 7. The lens L14 is a plano-convex lens and is positioned with its convex surface facing toward the prism 7. The lens L15 is a double-concave lens and is positioned with its larger curvature surface facing toward the prism 7. The lens L16 is a double-convex lens and is positioned with its larger curvature surface facing toward the prism 7. The lens L17 is a double-convex lens and is positioned with its larger curvature surface facing toward the negative film F.

The distances between the lens groups I to V are variable and the fifth lens group V is fixed relative to the prism 7.

The light measuring zoom lens 6 of this embodiment also satisfies the aforesaid formula (1) and (2).

The magnification M of the zoom lens 6 of this embodiment is also variable within the range of $-1/14.3$ to $-1/2.5$ and the focal length f(mm), the back focus Bf(mm), F-number $F_{NO}$ and the image height (negative size) Y(mm) of the zoom lens 6 at the respective magnifications are as shown in table 4. The effective F-number is 2.0 at any magnification.

TABLE 4

| magnification M | $-1/14.30$ | $-1/6.45$ | $-1/2.50$ |
|---|---|---|---|
| focal length f | 16.88 | 74.50 | $-113.29$ |
| back focus Bf | 33.31 | 22.83 | 79.70 |
| F-number $F_{NO}$ | 1.81 | 2.10 | — |
| image height Y | 6.72 | 21.40 | 48.83 |

The radii of curvature R(mm) of the respective lens surfaces, the axial surface separations d (mm) (the central thicknesses of the lenses and the air spaces between adjacent lenses), the refractive indexes N at D line of the lenses and the Abbe's number νd are as shown in table 5. In table 5, the numbers in the leftmost column represents the numbers given to the symbols R and d in FIG. 5.

TABLE 5

| NO | R | d | N | νd |
|---|---|---|---|---|
| 1 | $-512.82$ | 4.50 | 1.59143 | 61.2 |
| 2 | $-152.32$ | 0.19 | | |
| 3 | 227.06 | 7.49 | 1.59143 | 61.2 |
| 4 | $-114.29$ | 3.59 | 1.79191 | 25.7 |
| 5 | $-251.22$ | 1.0(14.65) | | |
| 6 | 103.56 | 1.78 | 1.79191 | 25.7 |
| 7 | 48.170 | 9.00 | 1.59143 | 61.2 |
| 8 | $-130.90$ | 0.10 | | |
| 9 | 37.244 | 5.00 | 1.59143 | 61.2 |
| 10 | 76.046 | (variable $D_A$) | | |
| 11 | 102.56 | 0.82 | 1.72341 | 50.3 |
| 12 | 17.996 | 4.95 | | |
| 13 | $-22.222$ | 0.82 | 1.72341 | 50.3 |
| 14 | 19.881 | 3.87 | 1.81262 | 25.5 |
| 15 | $-243.36$ | (variable $D_B$) | | |
| 16 | $-33.898$ | 0.82 | 1.72794 | 38.0 |
| 17 | $-342.06$ | (variable $D_C$) | | |
| 18 | 78.431 | 5.54 | 1.69416 | 31.1 |
| 19 | $-37.645$ | 3.55 | | |
| 20 | $-126.58$ | 4.65 | 1.62509 | 53.1 |
| 21 | $-56.735$ | 2.19 | | |
| 22 | $-17.794$ | 2.90 | 1.72794 | 38.0 |
| 23 | $-34.722$ | 11.00 | | |
| 24 | 0.0 | 5.00 | 1.64128 | 55.5 |
| 25 | $-35.842$ | 2.04 | | |
| 26 | $-125.79$ | 1.29 | 1.81264 | 25.5 |
| 27 | 38.615 | 0.99 | | |

TABLE 5-continued

| NO | R | d | N | νd |
|---|---|---|---|---|
| 28 | 71.429 | 6.20 | 1.59143 | 61.2 |
| 29 | $-38.950$ | 0.10 | | |
| 30 | 28.090 | 4.00 | 1.59143 | 61.2 |
| 31 | $-209.81$ | 5.00 | | |
| 32 | 0.0 | 21.0 | 1.51825 | 64.1 |
| 33 | 0.0 | | | |

R...radius of curvature
d...axial surface separation
N...refractive index
νd...Abbes number The focal lengths f1 to f5 of the first to fifth lens groups I to V are 149.30 mm, 61.15 mm, $-16.40$ mm, $-51.75$ mm and 32.46 mm, respectively.

The distances between the lens groups are variable. The distances $D_A$(mm), $D_B$(mm) and $D_C$(mm) between the second and third lens groups II and III, between the third and fourth lens groups III and IV and between the fourth and fifth lens groups IV and V at the respective magnifications (M) are shown in table 6. The distance between the first and second lens groups I and II are set to 1.00 mm when the prism 4 is in the optical path and to 14.65 mm when the prism 4 is not in the optical path. That is, when the prism 4 is not in the optical path, the first lens group I is positioned nearer to the negative film F by 13.65 mm than when the prism 4 is in the optical path, whereby the change in the optical length due to difference in the refractive index between the prim 4 and the air is compensated for. Thus also the zoom lens 6 of this embodiment has function to prevent change in magnification and deterioration of the performance in addition to the normal zooming function.

TABLE 6

| magnification M | $D_A$ | $D_B$ | $D_C$ |
|---|---|---|---|
| $-1/14.30$ | 1.25 | 29.36 | 4.39 |
| $-1/6.45$ | 18.32 | 9.10 | 7.58 |
| $-1/2.50$ | 30.86 | 2.85 | 1.29 |

Figures 6A, 6B:
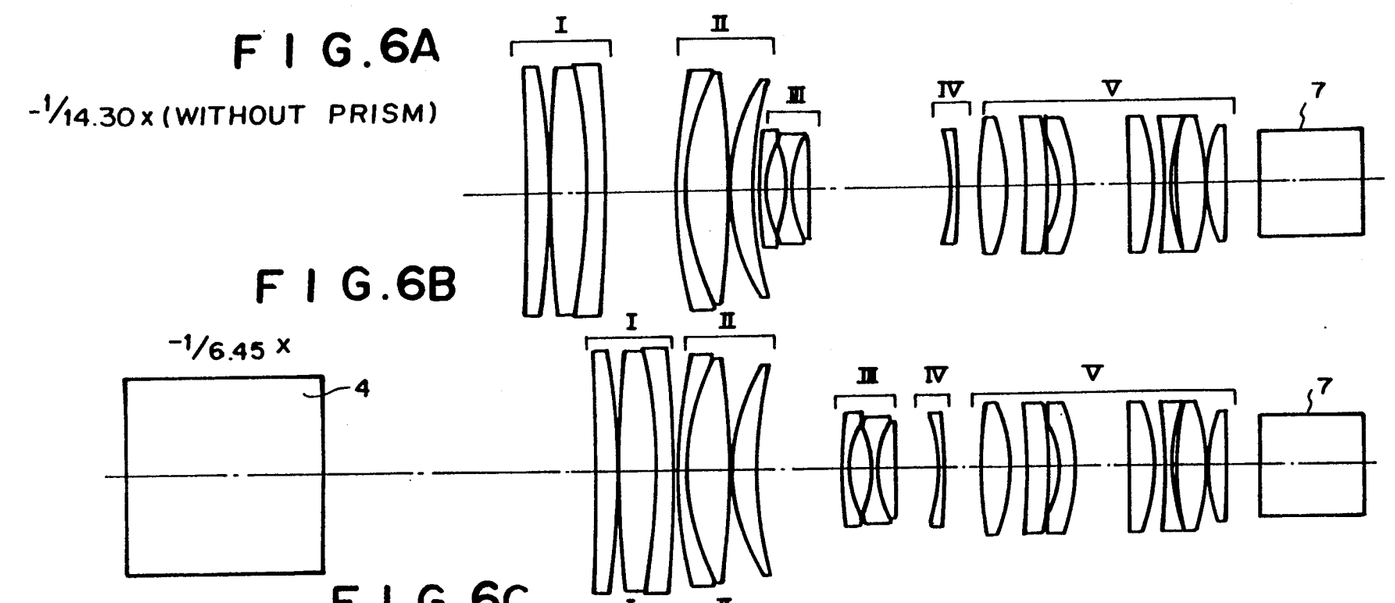
FIGS. 6A to 6C are cross-sectional views of the zoom lens at magnifications of −1/14.30, −1/6.45 and −1/2.50, respectively.
Figure 6C:
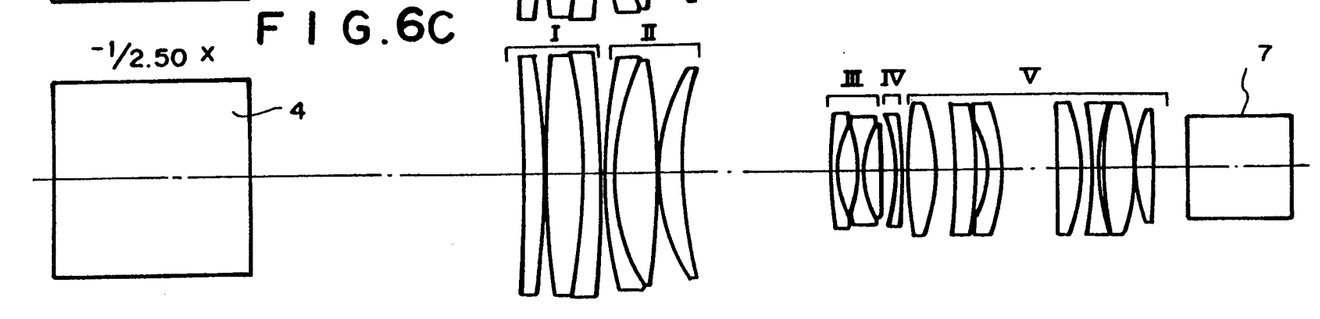
Figure 7A:
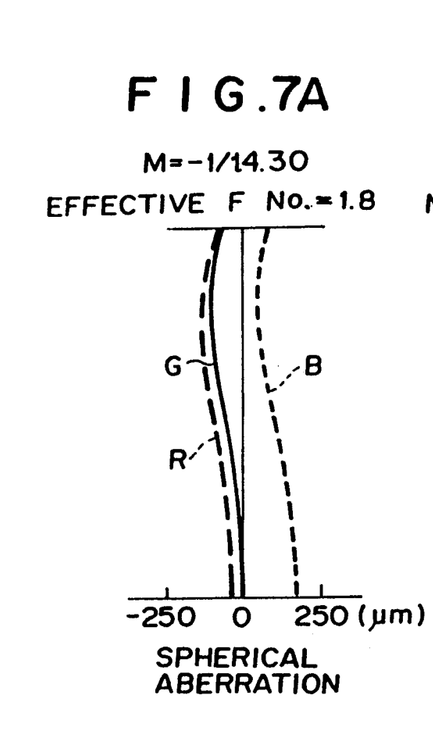
FIGS. 7A to 7C show the aberrations of the zoom lens at a magnification of −1/14.30.
Figure 7B:
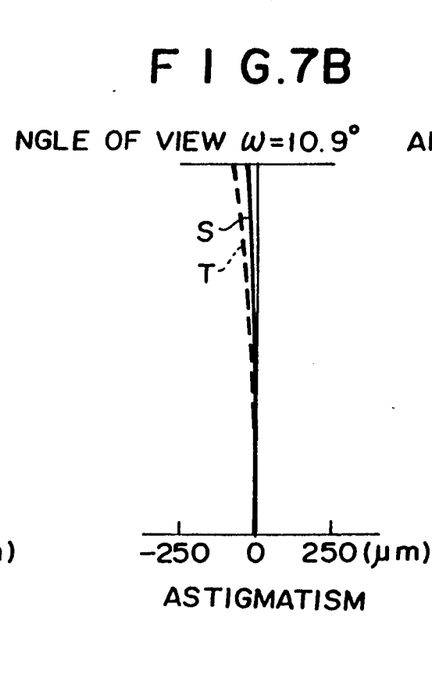
Figure 7C:
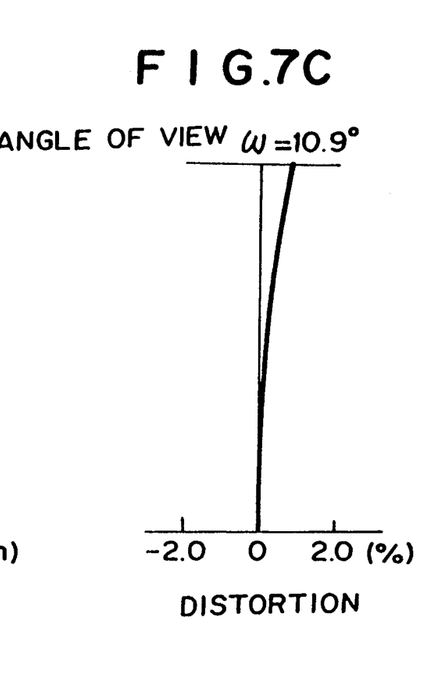
Figure 7D:
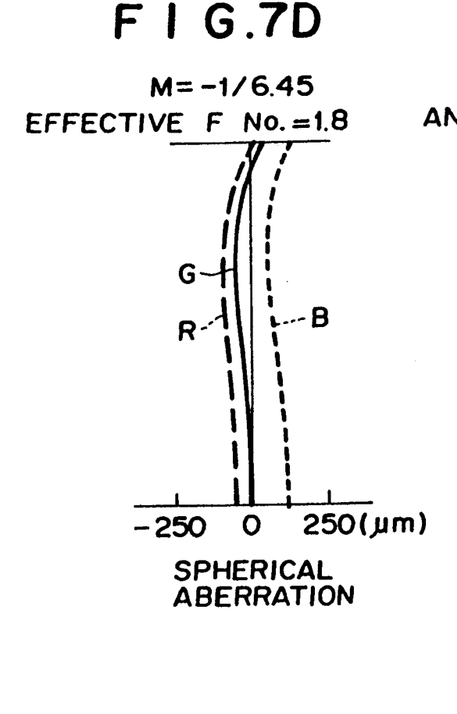
FIGS. 7D to 7F show the aberrations of the zoom lens at a magnification of −1/6.45.
Figure 7E:
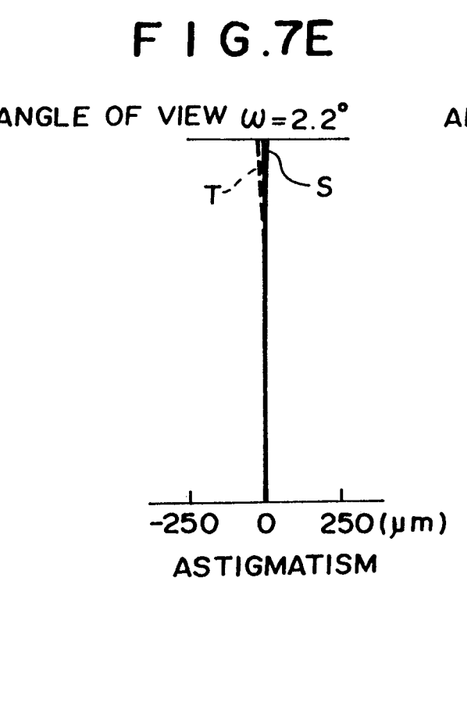
Figure 7F:
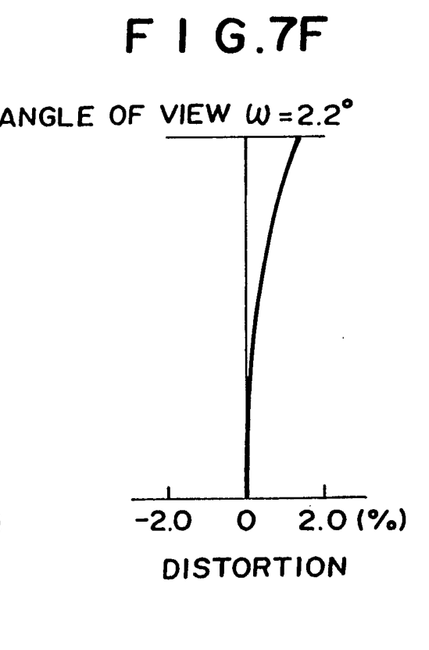
Figures 7G, 7H:
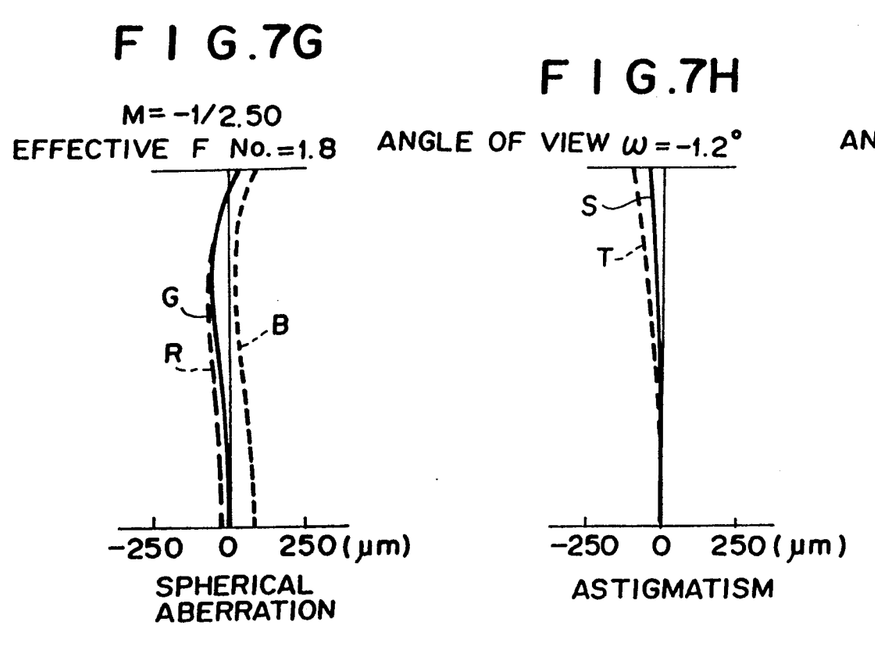
FIGS. 7G to 7I show the aberrations of the zoom lens at a magnification of −1/2.50.
Figure 7I:
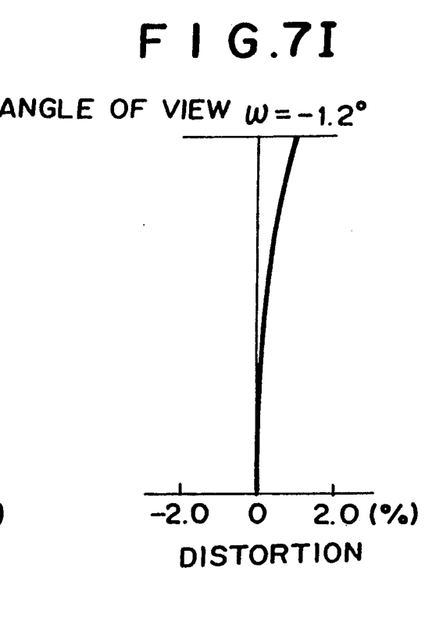

FIGS. 6A to 6C show the relative position of the first to fifth lens groups I to V at magnifications of $-1/14.30$ (without the prism 4), 31 1/6.45 and $-1/2.50$, respectively.

In this embodiment, since the distance between the first and second lens groups I and II can be switched between the two values described above, the magnification can be continuously changed even if the conjugate length changes in the course of zooming and at the same time, fluctuation in the respective aberrations can be suppressed.

FIG. 7 shows the aberrations at magnifications of $-1/14.30$, $-1/6.45$ and $-1/2.50$ in the zoom lens 6 of this embodiment.

As can be understood from FIG. 7, the zoom lens with a close-up lens of this embodiment exhibits excellent optical performance over its entire variable power range.

The zoom lens with a close-up lens need not be limited those described above in conjunction the first and second embodiments but may be variously changed. For example, the number of lenses in each lens group may be changed and the curvatures of the respective lenses may be changed.

Further if there is no limitation on the conjugate length or the size of the prism, the size of the lens and/or the prism may be changed by changing the focal length of the first lens group, thereby aberrations can be suppressed and easily corrected.

In the zoom lenses with a close-up lens described above, the first lens group I forms the close-up lens and the second to fifth lens groups II to V form the zoom lens. The zoom lens formed by the second to fifth lens groups is similar to those for normal home video cameras in the lens arrangement. Accordingly by attaching a close-up lens (the first lens group) conforming to the required conjugate length to the home video zoom lens and correcting the master lens group (the fifth lens group) thereof, a zoom lens having an infinite conjugate length can be obtained. For the purpose of correcting the conjugate length, the light bundle between the first lens group (close-up lens) and the second lens group should be afocal.

Though the zoom lens with a close-up lens is especially useful for a photographic enlarger, it can be applied to other various optical systems.

What is claimed is;

1. A zoom lens with a close-up lens comprising first to fifth lens groups arranged in this order from the object side, each of the first, second and fifth lens groups having a positive power and each of the third and fourth lens groups having a negative power, characterized in that said first to fifth lens groups are arranged so that the spaces between the second to fifth lens groups change when the zoom lens is zoomed from a shortest focal length to a longest focal length and at the same time the first lens group can be moved along the optical axis in response to change in the optical length between an object point and the first lens group so that the object side focal point of the first lens group coincides with the object point.

2. A zoom lens with a close-up lens as defined in claim 1 in which formulae $$2.0 < f1/f2 < 4.5$$

and $$10.0 < (1 - 1/N)d < 32.5$$

are satisfied wherein f1 represents the focal length of the first lens group, f2 represents the focal length of the second lens group, d represents the optical length in a prism inserted into the optical path between the object point and the first lens group and N represents the refractive index of the prism.

* * * * *